Oct. 7, 1941.     A. B. NEWTON     2,257,915
AIR CONDITIONING SYSTEM
Filed Feb. 7, 1938     2 Sheets—Sheet 1

INVENTOR
Alwin B. Newton
BY
George H. Fisher
ATTORNEY

Oct. 7, 1941.　　A. B. NEWTON　　2,257,915
AIR CONDITIONING SYSTEM
Filed Feb. 7, 1938　　2 Sheets-Sheet 2
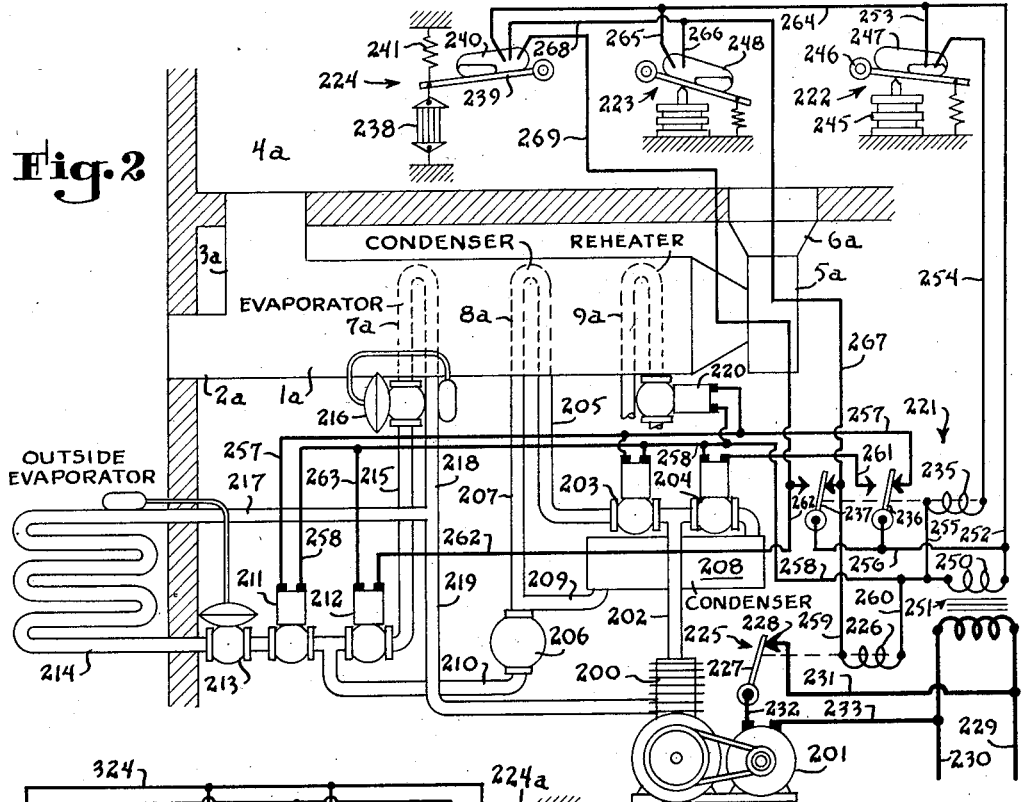
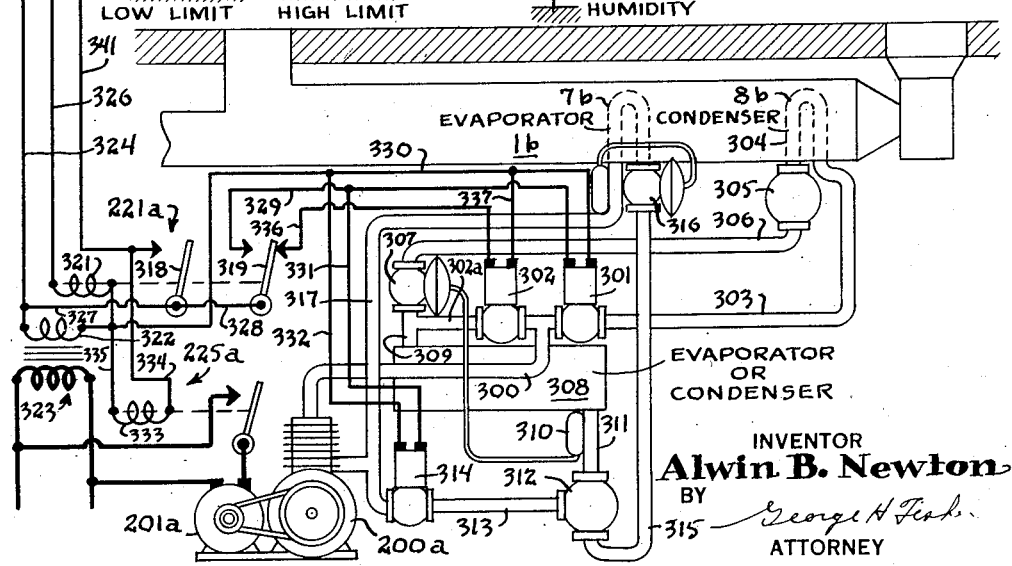
INVENTOR
Alwin B. Newton
BY
George H Fisk
ATTORNEY Patented Oct. 7, 1941

2,257,915

UNITED STATES PATENT OFFICE 2,257,915

AIR CONDITIONING SYSTEM

Alwin B. Newton, Minneapolis, Minn., assignor to Minneapolis-Honeywell Regulator Company, Minneapolis, Minn., a corporation of Delaware Application February 7, 1938, Serial No. 189,081

22 Claims. (Cl. 257—3)

This invention relates in general to air conditioning systems and is more particularly concerned with air conditioning systems of the type which are adapted to cool a space during the summer and to heat a space during the winter.

The primary object of my invention lies in the provision of a novel year-around air conditioning system which is adapted to automatically maintain proper temperature and humidity within a conditioned space at all times. More specifically, it is an object of this invention to provide a refrigeration system which is especially adapted for air conditioning purposes, such system acting to cool the space when cooling is required and to heat the space when heating is required, the heat utilized for heating the space being pumped from a source of heat at a low temperature level to a higher temperature level for heating the space.

It is a further object of this invention to provide a refrigeration system of this type with a prime mover such as an internal combustion engine, and to provide for utilizing the heat produced by this engine for supplementing the heat delivered to the space by the refrigeration system and also for providing a source of domestic hot water or other heated medium. With a system of this type, it sometimes happens that the waste heat dissipated by the engine is more than enough for providing domestic hot water or than can be delivered to the space by the heating apparatus. It is therefore another object of this invention to provide an arrangement for dissipating this excessive waste heat in the event that it cannot be utilized by domestic water consumption or by the heating apparatus. It is a further object of this invention to provide for transferring this heat which is dissipated from the domestic water storage system to the refrigeration system itself, for thereby supplying this dissipated heat to the space in the event that the system is operating on the heating cycle.

Another object of this invention is in the provision of an automatic control system which is operative to place the cooling system into operation whenever either the space temperature or humidity becomes excessive, and which is further operative to supply reheat in the event that reheat is necessary in order to maintain proper humidity conditions.

Another object of this invention is the provision of a reversible system adapted for heating or cooling, with an automatic control arrangement for placing the system in operation for heating the space when heat is necessary, for cooling the space when cooling is necessary, and for intermittently heating and cooling when dehumidification only is required.

A further object is the provision of a system of this general type which is adapted to simultaneously cool and reheat when dehumidification is required.

Another object is in the provision of a heating system comprising a refrigeration system which is arranged with the condenser in heat exchange relationship with the space, with a means for utilizing the heat of the condensed or partially condensed refrigerant for humidifying the space.

Other objects and features of my invention lie in various arrangements and sub-combinations which contribute towards the provision of an automatic system of the type above mentioned, and will be apparent from the following detailed description and the appended claims.

For a full disclosure of my invention, reference is made to the following detailed description and to the accompanying drawings, in which, Figure 1 shows diagrammatically a summer-winter air conditioning system utilizing a reversible cycle refrigeration system which is driven by means of an internal combustion engine;

Figure 2 shows a modified form of reversible cycle refrigeration system, and

Figure 3 shows a still further modified form of reversible cycle refrigeration system and controls.

Figure 1:
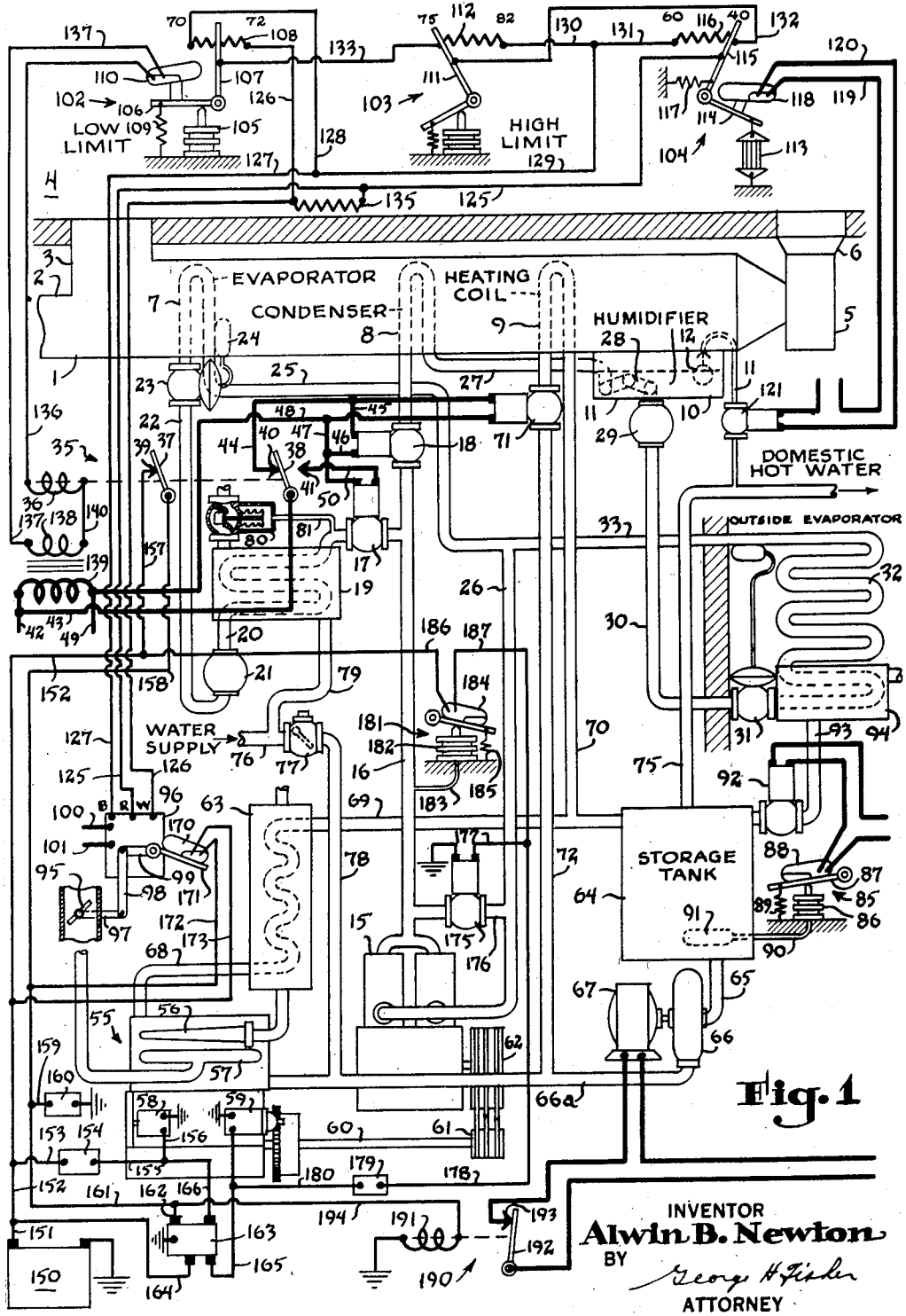

Referring to Figure 1, reference character 1 indicates a conditioning chamber having a fresh air inlet duct 2 and a return air duct 3, which duct is adapted to convey air from a space to be conditioned 4 to the conditioning chamber. The discharge end of the conditioning chamber 1 communicates with a fan 5 which discharges air into the conditioning space through a discharge duct 6. Located within the conditioning chamber 1 may be an evaporator coil 7, a condenser coil 8, a hot water heating coil 9 and a humidifier 10. The humidifier 10 may consist of a pan 11 adapted for containing water, the admission of water to this pan through a supply pipe 11 being controlled by means of a float valve 12.

The evaporator 7 and the condenser 8 form a part of a reversible cycle refrigeration system which includes a compressor 15. This compressor may be of any desired form and is attached to a discharge conduit 16 which leads to a pair of valves 17 and 18. The outlet of the valve 18 may be connected to a summer condenser 19 which may be water-cooled, and is adapted for condensing the refrigerant when the system is operating on the summer cycle. The refrigerant outlet of the condenser 19 is connected by a pipe 20 to a receiver 21, this receiver in turn being connected by a liquid line 22 to an expansion valve 23 which is located at the inlet of the summer evaporator 7. This expansion valve is preferably of the thermostatic type, including a thermostatic bulb 24 located at the outlet of the summer evaporator 7. This outlet is connected by means of pipes 25 and 26 to the suction side of the compressor.

The outlet of the valve 18 is connected to the inlet of the winter condenser 8, the outlet of this condenser being connected by means of a conduit 27 to a coil 28 located within the humidifier pan 11. The outlet of this coil may be connected to a receiver 29, this receiver in turn being connected by a liquid line 30 to the inlet of an expansion valve 31 which is located in advance of an outside or winter evaporator 32. This evaporator may be of any desired type, and may be located in the outside air, in the ground, or may if desired take the form of a heat exchanger through which well water or other heating medium is passed. The outlet of this evaporator may be connected by means of a pipe 33 to the compressor section pipe 26.

The valves 17 and 18 may be of either the solenoid or motorized type and are shown herein as being of a type which open when energized and which remain closed when deenergized. These valves may be controlled by means of a relay generally indicated as 35. This relay may consist of a relay coil 36 which is adapted to operate an armature which actuates switch arms 37 and 38. The switch arm 37 cooperates with an "in" contact 39, while the switch arm 38 cooperates with an "in" contact 40 and an "out" contact 41. When the relay coil 36 is energized, the switch arms 37 and 38 are brought into engagement with contacts 39 and 40 respectively. When, however, the relay coil 36 is deenergized, the switch arms 37 and 38 are pulled by means of springs or gravity to the right, thereby causing switch arm 37 to disengage contact 39 and causing switch arm 38 to engage the "out" contact 41. When the switch arm 38 engages the contact 40, as shown, the valve 18 will be energized by a circuit as follows: line wire 42, wire 43, switch arm 38, contact 40, wire 44, wire 45, valve 18, wire 46, wire 47 and wire 48 to line wire 49. At this time, the valve 17 will be deenergized due to disengagement of switch arm 38 with contact 41. The valve 17 will therefore be closed when the valve 18 is open. For this position of valve 18, the compressed refrigerant from the compressor 15 will pass into the winter condenser 8. Due to the flow of air across the condenser 8, heat will be absorbed from the compressed refrigerant, this causing heating of the air passing through the conditioning chamber and also causing the refrigerant to be condensed. This condensed or liquified refrigerant then passes through the coil 28 in the humidifier and gives up its remaining heat to the water in the humidifier pan 11. The liquid refrigerant then passes through the receiver 29 to the expansion valve 31. This expansion valve reduces the pressure of the refrigerant to such a value that it is capable of being evaporated at the temperature to which the evaporator 32 is subjected. The refrigerant therefore evaporates, and in doing so, absorbs heat from the medium surrounding the evaporator, and the evaporated refrigerant passes through the pipes 33 and 26 to the compressor, wherein it is again compressed and returned to the winter condenser 8 where it gives up the heat which was picked up by the outside evaporator 32.

When the relay coil 36 is deenergized, the energizing circuit for the valve 18 will be broken, thereby causing the valve 18 to close. At this time, due to engagement of the switch arm 37 with contact 41, the valve 17 will be energized by the following circuit: line wire 42, wire 43, switch arm 38, contact 41, wire 50, wire 47 and wire 48 to line wire 49. This will cause opening of the valve 17. Under such conditions, the compressed refrigerant from the compressor will pass into the summer condenser 19 wherein it is condensed. This condensed refrigerant will then pass through the receiver 21 and the expansion valve 23 into the summer evaporator 7, in which it evaporates and absorbs heat from the air being conditioned. The thereby evaporated refrigerant then passes back to the compressor 15 through the pipes 25 and 26.

From the description thus far, it should be apparent that the refrigeration system is capable of either heating or cooling the space, the system being changed from the heating to the cooling cycle and vice versa by means of the relay 35. The control for the relay 35 will be described later in this specification.

The compressor 15 in this embodiment of the invention may be driven by means of an internal combustion engine 55. This engine may be of any desired type, and includes an exhaust manifold 56, an intake manifold 57, a direct current generator 58 and a starting motor 59. This engine may drive the compressor 15 through a drive shaft 60 having a pulley 61 which drives the compressor pulley 62 by means of belts as shown.

In accordance with my invention, provision is made for utilizing the jacket heat and the exhaust heat of the engine for heating the space when the system is operating on the heating cycle, and for also providing a supply of hot water for domestic use. To this end, an exhaust gas heat exchanger 63 is provided which is adapted to heat water or other medium by means of the heat of the exhaust gases. Reference character 64 indicates a storage tank in which water heated by the engine may be stored. Attached to this storage tank is an outlet pipe 65 which leads to a circulating pump 66. This pump may be of any desired type, and may be either driven directly by the engine or may be driven by an electric motor 67, as shown. The discharge of this pump is connected by a pipe 66a which leads to the inlet of the water jacket of the engine 55. The outlet of the water jacket is connected to the inlet of the heat exchanger 63 by means of a pipe 68 and the outlet of the heat exchanger 63 is connected by means of a pipe 69 to the inlet of the storage tank 64. The pipe 69 may also be connected to a pipe 70 which leads to the outlet of the heating coil 9. The inlet of the heating coil 9 may be connected to a solenoid or motorized valve 71, which in turn is connected by pipe 72 to the pipe 66a. This valve 71 is connected in parallel with the valve 18 as shown. The valve 71 is therefore open during the heating cycle and closed during the cooling cycle. With the foregoing piping arrangement, it should be noted that the pump 67 circulates water from the storage tank through the engine water jacket and the exhaust gas heat exchanger back to the storage tank, and also circulates water from the storage tank through pipe 72 to the heating coil 9 and from this heating coil through pipe 70 back to the storage tank. The storage tank 64 is provided with a draw-off pipe 75 which may convey the heater water to points of use within the building. In order to supply make-up water to the storage tank 64, a water supply pipe 76 is provided, this pipe being connected to a check valve 77 which in turn is connected by a pipe 78 to the pipe 66a. By this arrangement, it will be noted the make-up water is supplied to the system at a point wherein this cold unheated water will not be supplied to the heating coil or mixed with the heated water in the storage tank. The water supply pipe 76 may also be connected to a pipe 79 which leads to the summer condenser 19. This condenser may be provided with a valve 80 for controlling the flow of water through the condenser. This valve 80 may be of any desired type and is preferably a pressure actuated type of valve which is arranged to close when the pressure of the refrigerant falls to a predetermined value and to open when the refrigerant pressure rises above such value. The valve 80 is therefore provided with a pressure connection 81 leading to the outlet side of the refrigerant valve 17. When the valve 17 is closed, the pressure applied to valve 80 will be low and consequently this valve will close and prevent flow of cooling water through the condenser when the system is operating on the heating cycle. When the system operates on the cooling cycle, however, the valve 80 will cause just enough water to flow through the condenser as to prevent the head pressure from rising above a predetermined value.

At times there may be more waste heat produced by the engine 55 than is necessary for operating the heating coil 9 and meeting the demand for domestic hot water. Under such circumstances, the temperature of the water in the storage tank would become excessive. In order to avoid this result, a temperature controller 85 is provided. This temperature controller may be of any desired type, and is shown herein as comprising a bellows 86 which is adapted to actuate a pivoted arm 87 which carries a mercury switch 88, this arm being held against the bellows by means of a spring 89. The bellows 86 is connected by a capillary tube 90 to a control bulb 91 located within the storage tank. The bellows, bulb and tube contain a suitable volatile fluid which causes the pressure within the bellows to vary in accordance with changes in temperature at the control bulb 91. This instrument may be so designed and adjusted as to cause bridging of the contacts of mercury switch 88 when the temperature of the domestic water rises to a predetermined high value, such as 180° F., while remaining in the position shown when the water temperature is below such value.

The temperature controller 85 is adapted to control a motorized valve 92, which valve is located in a discharge pipe 93 leading from the storage tank. This pipe 93 may lead to a heat exchanger 94 which is in heat exchange relationship with part of the evaporator 32. By this arrangement, when the temperature of the domestic water becomes excessive, the valve 92 will be opened thereby causing water to be discharged from tank 64. This will permit the entry of cold water into the system, which results in reducing the temperature of the domestic hot water. At the same time, the discharged hot water is passed into heat exchange relationship with the evaporator and consequently if the system is operating on the heating cycle, the heat of the discharged water will be recovered by the evaporator and thereby transferred to the air being heated by the winter condenser 8. While I have shown the heat exchanger 94 as surrounding part of the evaporator coil 32, it will be understood that if desired the heat exchanger 94 may be separate from the evaporator 32. Also, it will be apparent that if desired, the heat exchanger 94 could be applied to the outlet of the evaporator for thereby superheating the refrigerant leaving the evaporator instead of evaporating it, as would occur in the position shown. If desired, the water discharged from the tank 64 may first be passed through a heating coil in the conditioning chamber for reducing its temperature before being passed into heat exchange relationship with the evaporator coil 32.

Referring again to the internal combustion engine 55, this engine may be controlled by means of a throttle valve 95 which may be actuated by means of a proportioning motor 96, by means of a lever arm 97 and a link 98 which is connected to the actuating arm 99 of the proportioning motor 96. The proportioning motor 96 may be of the type shown and described in Patent No. 2,028,110 granted to Daniel G. Taylor on January 14, 1936. This type of proportioning motor is provided with power terminals which may be connected to line wires 100 and 101, and is adapted to be controlled by means of one or more potentiometer type of controllers. This type of motor is provided with three control terminals indicated B, R and W, and is adapted to cause its actuating arm to assume positions corresponding to the relative amounts of resistance connected between the terminals R and W, and between terminals R and B. If equal amounts of resistance are connected between these terminals, the motor will assume an intermediate position as shown wherein the throttle valve 95 is half-open. However, if terminals R and W are short-circuited while resistance is interposed between terminals R and B, the motor will assume an extreme position in which the throttle valve 95 is completely closed. If terminals B and R should be short-circuited while resistance is interposed between terminals R and W, the motor will assume its other extreme position in which the throttle valve is wide open. For intermediate values of relative resistance connected across these terminals, the motor will assume intermediate positions.

The proportioning motor 96 is arranged to be controlled by means of a potentiometer type low limit temperature controller 102, a potentiometer type high limit temperature controller 103, and a humidity controller 104. These controllers may be of any desired construction. The low limit controller may consist of a bellows 105 cooperating with an actuating arm 106 of a pivoted bell crank lever having a control arm 107 which cooperates with a control resistance 108. The bellows 105 may be subjected to the space temperature or to the return air temperature, and in some instances may even be located outside. This bellows contains a volatile fluid wherefore the pressure therein varies in accordance with changes in temperature, the resulting expansion and contraction of the bellows causing movement of the control arm 107 across the control resistance 108. This instrument may be so designed and adjusted that when the space temperature is at 70° F. the bellows 105 will be contracted sufficiently under the action of spring 109 as to cause the control arm 107 to engage the extreme left-hand end of resistance 108, and to engage the extreme right-hand end of said resistance when the space temperature rises to 72° F. This low limit controller may also actuate auxiliary contacts to cause closing of the contacts when the space temperature falls below 72° and to cause opening of such contacts when the space temperature rises above this value. These contacts may take the form of electrodes of a mercury switch 110 which is actuated by the actuating arm 106.

The high limit temperature controller 103 may be of the same type as the controller 102. This instrument, however, is designed to operate at a higher operating temperature than the controller 102. For instance, if desired this instrument may be so designed and adjusted that when the return air temperature is at 75° F. or below, the control arm 111 thereof will engage the extreme left-hand end of the resistance 112, while engaging the extreme right-hand end of resistance 112 when the space temperature rises to 82° F.

The relative humidity controller 104 may consist of a humidity responsive device 113 which comprises a plurality of strands of hair or other moisture responsive material secured together by suitable clamping members, the lower of which may be attached to a suitable fixed support. The upper clamping member of this device may be attached to the actuating arm 114 of a bell crank lever including a control arm 115 which is arranged to wipe across a resistance 116. A spring 117 may be provided for urging the actuating arm 114 against the action of the humidity responsive device, thereby maintaining the strands taut. Upon an increase in relative humidity, these strands will increase in length, thereby permitting the control arm 115 to shift to the left across the resistance 116. Upon a decrease in humidity, however, the strands will shrink, thereby causing movement of the control arm 115 in the opposite direction. This instrument may be designed and adjusted so that when the relative humidity is at 40% or below, the control arm 115 will engage the right-hand end of resistance 116, while when the humidity rises to 60% the control arm will engage the left-hand end of the control resistance. If desired, this humidity controller may be arranged to actuate a suitable switching means such as a mercury switch 118 for causing closing of this switch when the relative humidity falls to 40%. This mercury switch 118 may be connected by means of wires 119 and 120 to a water valve 121 which is interposed in the water supply pipe 11 for the humidifier. By this arrangement, when the relative humidity is above 40%, the valve 121 will be closed thereby preventing supply of water to the humidifier. When, however, the relative humidity falls below 40% the valve 121 will be opened for permitting operation of the humidifier.

Referring to the connections of the controllers 102, 103 and 104 with the proportioning motor 96, the R terminal of this motor is connected by means of a wire 125 to the control arm 115 of the humidity controller, and the W terminal of the motor is connected to the right-hand end of control resistance 108 of the low limit controller by means of wire 126. The B terminal of the proportioning motor is connected to a wire 127 which is joined to a wire 128 leading to the left-hand end of the control resistance 108. The wire 127 is additionally connected to the right-hand end of resistance 112 and the left-hand end of resistance 116 by means of wires 129, 130 and 131. The right-hand end of the resistance 116 is connected by a wire 132 to the control arm 111 of the high limit temperature controller 103, and the left-hand end of the resistance 112 of this controller is connected by a wire 133 to the control arm 107 of the low limit controller.

With the controllers 102, 103 and 104 in the positions shown, it will be seen that the space relative humidity is below 40% as indicated by the control arm 115 engaging the right-hand end of the control resistance 116. Also, the space temperature is at 71° F. as indicated by the control arm 107 of the low limit controller engaging the mid portion of the control resistance 108. For this value of temperature, the control arm 111 of the high limit controller is engaging the left-hand end of the control resistance 112. This is the normal position of the three controllers during the heating cycle of the system. For these positions of the controllers, the control arm 107 of the low limit controller is connected to the R terminal of the proportioning motor as follows: wire 125, control arm 115, wire 132, control arm 111 and wire 33 to the control arm 108. As both ends of the resistance 108 are directly connected to the proportioning motor 96, it will be apparent that the control potentiometer of the low limit controller is directly connected to the proportioning motor and hence the position assumed by this motor will correspond to the position of the control arm 107 on the control resistance 108. With the control arms 111 and 115 in the positions shown, the control resistances 112 and 116 will be connected in parallel between terminals R and B of the motor as follows: terminal R, wire 125, control arm 115, resistance 116, wire 131 and wire 129 to terminal B; and terminal R, wire 125, control arm 115, wire 132, control arm 111, resistance 112, wire 130, and wire 129 to terminal B. The effect of this resistance connected between terminals R and B would be to crowd the operating range of the motor under the control of the low limit controller 102 to less than its designed range of operation. In order to avoid this result, a resistance 135 is connected between wires 125 and 126, which thereby places this resistance across terminals R and W. This resistance is designed to be equal to the combined parallel resistances 112 and 116, and therefore the resistance 135 will completely balance out the effect of the resistances 112 and 116. Therefore, during the heating cycle of the system, the controller 102 is completely in control of the proportioning motor 96, and therefore the throttle valve 95 will be positioned in accordance with changes in temperature at this thermostat. Upon a rise in space temperature, the control arm or slider 107 will be shifted to the right across the resistance 108, which decreases the portion of this resistance which is connected between terminals R and W while increasing the portion of the resistance which is connected between terminals R and B. This will cause the proportioning motor to follow up the movement of the control arm 107 in a direction to cause closing of the throttle valve 95, thereby decreasing the engine speed and hence the amount of heat supplied to the space. Upon a decrease in temperature, the opposite action will take place, which causes the engine speed to be increased for thereby supplying more heat to the space.

When the space temperature rises above 72° F., it will be apparent that when the controllers 103 and 104 are in the positions shown, the terminals R and W of the proportioning motor will be substantially short-circuited, which will cause the proportioning motor to completely close the throttle valve 95. If now should either the space temperature or the space relative humidity become excessive, the throttle valve will be opened by either the controller 103 or 104 an amount corresponding to the prevailing temperature or relative humidity. This action will now be described. When the control arm 107 engages the right-hand end of resistance 108, the high limit temperature controller will be conditioned for causing opening of the throttle valve. At this time, the R terminal of the proportioning motor will be connected to control arm 111 of controller 103 by means of wire 125, control arm 115 and wire 132. Also at this time, the left-hand end of control resistance 111 will be connected to terminal W of the motor by means of wire 126, control arm 107 and wire 133. Inasmuch as the right-hand end of resistance 112 is connected directly to terminal B of the motor by means of wires 129 and 130, it will be apparent that the potentiometer of the high limit controller 103 will now be directly connected to the proportioning motor. With the space temperature below 75° F., the terminals R and W of the proportioning motor will be short-circuited as follows: terminal R, wire 125, control arm 115, wire 132, control arm 111, wire 133, control arm 107 and wire 126 to terminal W. As pointed out previously, this will cause complete closing of the throttle valve. As the space temperature rises above 75°, however, the control arm 111 will be shifted to the right across resistance 112, which places a portion of the resistance 112 between terminals R and W and decreases the portion of the resistance between terminals R and B. This will cause movement of the proportioning motor for opening the throttle valve a degree, depending upon the degree of movement of the control arm 111 on the resistance 112. When the space temperature increases to 82° F., the control arm 111 will engage the right-hand end of resistance 112 which will substantially short-circuit terminals R and B of the proportioning motor 96 as follows: terminal R, wire 125, control arm 115, wire 132, control arm 111, wire 130, wire 129 and wire 127 to terminal B. This will cause the proportioning motor to rotate to its other end of its range of movement for thereby opening the throttle valve 95 wide. From the foregoing, it will be apparent that when the relative humidity is below 40% the high limit temperature controller is in full control of the proportioning motor 96 and positions this motor in a manner to increase the throttle valve opening as the space temperature increases and to decrease the throttle valve opening upon decrease in space temperature.

In the event that the space temperature is between 72° and 75°, it will be apparent that the control arm 107 will engage the right-hand end of the resistance 108 and the control arm 111 will engage the left-hand end of resistance 112. This will condition the space relative humidity controller 104 for independently operating the proportioning motor. At this time the right-hand end of the control resistance 116 of this controller will be connected directly to terminal W of the proportioning motor as follows: terminal W, wire 126, control arm 107, wire 133, control arm 111, wire 132 to resistance 116. As the control arm 115 of this controller and the left-hand end of resistance 116 are directly connected to terminals R and B, respectively, of the motor by means of wires 125, 131, 129 and 127, it will be apparent that the humidity controller 104 will be placed in control of the proportioning motor 96. If the space relative humidity is below 40%, the terminals R and W of the proportioning motor will be short-circuited by the circuit pointed out previously, which causes the motor to completely close the throttle valve. If the relative humidity should rise above 40%, the control arm 115 of the humidity controller will be shifted to the left across resistance 116. This will insert part of the resistance 116 between the terminals R and W and will decrease the portion of this resistance between terminals R and B. Consequently, the proportioning motor will be caused to open the throtle valve 95 a degree depending upon the amount of movement of the control arm 115 across the resistance 116. If the humidity should rise to 60%, the proportioning motor will cause the throttle valve 95 to be opened wide.

It will therefore be apparent that upon either high temperature or high humidity the throttle valve 95 will be opened, the degree of opening being dependent upon the degree of excessiveness of either the relative humidity or temperature. It will also be apparent that the controllers 103 and 104, when off their extreme positions, will cause positioning of the valve in accordance with the combined or resultant effect of temperature and humidity, which will be greater than either of the effect of temperature alone or humidity alone. The three controllers 102, 103 and 104 in effect conjointly control the throttle valve motor 96 in a manner to cause opening of the throttle valve if the space temperature should fall too low or rise too high, or if the space relative humidity should become excessive, the control of the motor being shifted from one controller to the others when the demand of that controller is satisfied.

The relay 35 is preferably controlled by the auxiliary switch 110 on the low limit controller 102. For this purpose, the left-hand end of the relay coil 36 is connected to the mercury switch 110 by means of a wire 136 and the other terminal of the switch 110 is connected by a wire 137 to the secondary 138 of a step-down transformer having a primary 139 connected across the line wires 42 and 49. The other terminal of the secondary 138 is connected to the relay coil 36 by wire 140. It will be apparent that this wiring arrangement will cause the relay coil 36 to be energized whenever the switch 110 is closed. Inasmuch as this switch 110 is arranged to remain open when the space temperature is above 72° F. and to close when the space temperature falls below this value, the relay coil 36 will be energized only when the space temperature falls below 72° F. Therefore, so long as the space temperature is above 72° F. the valves 18 and 71 will be deenergized while the valve 17 will be energized, this action causing the system to be conditioned for operation on the cooling cycle. When the space temperature falls below 72° F., however, the valve 17 will be closed and the valves 18 and 71 will be opened, which thus conditions the system for operation on the heating cycle.

The engine 55 is preferably provided with an automatic starting and ignition circuit for thereby permitting automatic starting and stopping of the engine under the control of the controllers previously described. Referring to the starting and ignition system for the engine, reference character 150 indicates a storage battery, one terminal being grounded as indicated. The other terminal of the storage battery is connected to the generator 58 by means of wires 151, 152, 153, cut-out 154 and wires 155 and 156. This terminal of the storage battery is also connected by wires 151, 152 and 157 to the contact 39 on the relay 35. The contact 39 and its cooperating switch arm 37 form an ignition switch for the engine 55. Switch arm 37 is connected by wires 158 and 159 to an ignition coil 160 for the engine. The wire 159 is also connected to a wire 161 which leads to the control terminal 162 of the starting relay 163. This starting relay may be of any desired type, such, for instance, as the automatic starting relay disclosed in Patent No. 1,773,913 issued to L. K. Loehr et al. on August 26, 1930. This type of starting relay is arranged to cause energization of the starting motor whenever the ignition circuit for the engine is closed and to cause deenergization of the starting motor when the engine starts, as evidenced by reduction in starting motor current and by operation of the engine generator. For this purpose, the starting relay is provided with a first load terminal which is connected to the storage battery by a wire 164, and a second load terminal which is connected to the starting motor 59 by a wire 165. This relay is also provided with a generator terminal which is connected to the generator 58 by wire 166.

With the wiring arrangement just described, it should be apparent that when the switch arm 37 of relay 35 engages the contact 39, the ignition coil 160 of the engine will be energized and also control circuit of the starting relay will be energized, which causes operation of the starting motor for placing the engine 55 into operation. When the engine starts, the resulting reduction in current taken by the starting motor will cause the relay 163 to open its load switch and this switch will be held open by current flowing from the generator. This will deenergize the starting motor and prevent it from being operated so long as the engine remains in operation. The engine will now operate at a speed determined by the position of the throttle valve 85 and will operate until the ignition circuit is opened. In accordance with my invention, provision is also made for starting the engine and maintaining it in operation whenever the throttle valve is opened a predetermined amount. For this purpose, an auxiliary switch 170 is provided, which is actuated by the proportioning motor 96. This switch is illustrated as being of the mercury type and is shown as being mounted upon an arm 171 which is attached to the operating arm 99 of the proportioning motor. This switch is so mounted that it will close whenever the throttle valve is opened past a minimum position, and open whenever the throttle valve is closed to this minimum position. The switch 170 is connected by wires 172 and 173 to the wires 158 and 152 respectively, and is therefore connected into the engine ignition circuit in parallel with the ignition switch on the relay 35. Thus, whenever either of these switches is closed, the engine will operate.

When the engine is being started, it is desirable to remove the compressor load from it. For this purpose I have provided a by-pass valve 175 which is located in a by-pass 176 between the high pressure line 16 and the suction line 26 for the compressor. This by-pass valve may be of either the motorized or solenoid type. For example, the valve may be of the type shown in the patent to Willis H. Gille, No. 2,114,961, issued April 19, 1938. One terminal of this valve is grounded as shown, while the other terminal is connected by means of wires 177 and 178, reverse current relay 179 and wire 180 to the wire 165 which leads from the starting relay 163 to the starting motor 59. By this arrangement, the by-pass valve 175 is energized simultaneously with the starting motor 59 and therefore while the starting motor is starting the engine, the by-pass valve 175 will be opened, which causes unloading of the compressor 15, therefore permitting relatively easy rotation of the engine 55 by the starting motor.

In accordance with my invention, I also provide means for opening the by-pass valve 175 whenever the head pressure of the compressor becomes dangerously high, such as may be caused by a failure of flow of cooling water to the condenser during the cooling cycle or failure of the fan during the heating cycle. To this end, a high pressure controller 181 is connected to the discharge line 16 of the compressor. This controller may include a bellows 182 which is connected to the discharge line 16 by a tube 183, this bellows being arranged to actuate a pivoted mercury switch carrier which carries a mercury switch 184. This instrument is so designed that when the head pressure is below a predetermined value, the bellows will be held collapsed by a spring 185 which retains the mercury switch 184 in the open position as shown. When the head pressure becomes excessive, however, the bellows 182 will expand against the action of spring 185, thereby causing tilting of the mercury switch 184 to closed position. This mercury switch 184 may be connected by wire 186 to the wire 152 and may be also connected by the wire 187 to the wire 177 leading to valve 175. Hence, whenever the head pressure becomes excessive, the closure of the mercury switch 184 will energize the valve 175 as follows: battery 156, wire 151, wire 152, wire 186, mercury switch 184, wire 187 and wire 177 to the valve 175. At this time, short-circuiting through the starting motor 59 is prevented by the reverse current relay 179 which is interposed between the engine starting circuit and the valve 175. It should be seen from the foregoing, that whenever the head pressure of the compressor becomes excessive the by-pass valve 175 will be opened, thereby unloading the compressor and preventing any damage to the system.

While the motor 67 and the water pump 66 may operate continuously, I prefer to place this motor out of operation whenever the engine stops. For this purpose, the relay 190 having a relay coil 191 for operating a switch arm 192 cooperating with a contact 193, is provided. The switch arm 192 and the contact 193 are connected to control the circuit for motor 67 as shown. One end of the relay coil 191 is grounded while the other end of this coil is connected by wire 194 to the control circuit terminal of the starting relay 163. By this arrangement, whenever the ignition circuit for the engine is closed, the relay coil 191 will be energized, which causes engagement of switch arm 192 with contact 193 for thereby energizing the pump motor 67. When, however, the ignition circuit for the engine is opened, the relay coil 191 will be deenergized, thereby permitting disengagement of switch arm 192 from contact 93 for deenergizing the pump motor 67.

Operation of Figure 1

With the parts in the position shown, the space temperature is at 71° and the relative humidity is below 40%. As described previously, the illustrated positions of the controllers will place the low limit controller 102 in complete control of the throttle valve motor 96, and due to the control arm 107 of this controller engaging the center of the control resistance 108, the throttle valve motor has assumed mid position, in which the throttle valve 95 is half-open. Due to the temperature being below 72° F., the auxiliary switch 110 of the low limit controller 102 is closed, which causes energization of the relay coil 36 of the changeover relay 35. This causes the switch arm 38 of this relay to engage the contact 40, which causes opening of the valves 18 and 71, thereby conditioning the system for operating on the heating cycle. At this time, the valve 17 is deenergized and consequently is closed for preventing refrigerant from entering the summer condenser 19. This causes the condenser water valve 80 to remain closed, thereby preventing flow of cooling water through the condenser at this time. Due to the ignition circuit for the engine being closed both by the relay 35 and the auxiliary switch 170, the engine is in operation. At this time also, the circulating pump relay 190 is energized and consequently the circulating pump is operating for circulating water from the storage tank into heat exchange relationship with the engine and also for circulating water from the tank through the heating coil 9 and back to the tank. The system is therefore in operation for transferring the waste heat of the engine to the space being conditioned, and is also absorbing heat from outside the space and raising its temperature for supplying this heat to the space.

If the space temperature should decrease, the low limit controller 102 will, in the manner previously described, cause the throttle valve motor 96 to open the motor valve 95 further, thereby increasing the engine speed and thus increasing the amount of heat supplied to the space. Conversely, as the space temperature increases, the low limit controller 102 will cause closing of the throttle valve 95 for thereby decreasing the engine speed, thus decreasing the heat supply. As the space temperature approaches 72°, the throttle valve 95 will reach its minimum position, at which time the mercury switch 170 will open. When the space temperature reaches 72° F., the mercury switch 110 of the low limit controller will open, thereby deenergizing the changeover relay 35 which causes opening of valve 17 and closing of the valves 18 and 71 for thereby conditioning the system for operation on the cooling cycle. At the same time that the refrigeration cycle is reversed, the switch arm 37 of the relay 35 will disengage contact 39, thus opening the engine ignition circuit for thereby stopping the engine and placing the pump 67 out of operation. The system will then remain idle until either the space temperature again falls below 72° or until the space temperature rises above 75°, or until the space relative humidity becomes excessive.

If the space temperature rises above 75°, the high limit temperature controller 103 will, in the manner previously described, cause the throttle valve 95 to be opened to some extent. When the throttle valve is thus opened, the auxiliary switch 170 will close, which completes the ignition circuit for the engine thereby placing the engine into operation and also placing the circulating pump 67 into operation. At this time, the flow of refrigerant will be through the summer condenser 19 and the evaporator 7, which is located within the conditioning chamber. Due to the passing of refrigerant into the condenser 19, the condenser water valve 80 will be opened to a degree necessary for maintaining the head pressure at a desired value. As the space temperature increases, it will be apparent that the throttle valve 95 will be opened further, thereby increasing the engine speed and the amount of cooling done by the system. At this time it will be apparent that the engine speed will be determined by the conjoint action of the temperature controller 103 and the humidity controller 104, the engine speed being increased upon an increase in either temperature or humidity and vice versa. It will also be apparent that at this time, the engine speed will be dependent upon the resultant effect of temperature and humidity, which will be greater than the effect of temperature alone or humidity alone.

In the event that the space temperature may be sufficiently low but the relative humidity be excessive, as occurs during cool damp weather, the humidity controller, in the manner previously described, will cause opening of the throttle valve 95 for placing the system into operation for dehumidifying the space. At this time, the engine speed will be determined entirely by the relative humidity prevailing within the space. The air in passing over the evaporator 7 will be of course cooled as well as dehumidified, and consequently the space temperature will be reduced as well as the humidity. However, when the space temperature is reduced to 72° F., the auxiliary switch 110 on the low limit controller 102 will cause energization of the changeover relay 35 which thereby reverses the operation of the system and causes the system to now reheat the space instead of cooling and dehumidifying the space. This action will result in the space temperature again being raised and when it rises above 72° F. the changeover relay will again be deenergized, thus again placing the system in operation for cooling and dehumidifying the space. The control system which I have disclosed therefore provides reheat whenever necessary in order to reduce excessive humidity conditions, this reheat being supplied intermittently by reversing the operation of the system.

Figure 2

Referring to Figure 2, this figure shows a reversible cycle system of the same general type shown in Figure 1. In this figure, however, I have shown two-position type of temperature and humidity controllers, and a slightly modified form of system and control sequence. The conditioning chamber 1a is provided with a fresh air inlet 2a, a return air duct 3a, and is connected to a fan 5a which discharges conditioned air through a discharge duct 6a into the space 4a. This chamber is also provided with a summer evaporator 7a, a winter condenser 8a and a reheater or heating coil 9a. Reference character 200 indicates a compressor which may be driven by means of an electric motor 201 or by an internal combustion engine if so desired. The discharge of this compressor is connected to a conduit 202 which leads to a pair of valves 203 and 204. The outlet of the valve 203 is connected by a conduit 205 to the inlet of the winter condenser 8a, the outlet of this condenser being connected to a receiver 206 by means of a conduit 207. The outlet of the valve 204 in turn is connected to the summer condenser 208 which in turn is connected to the receiver 206 by a conduit 209. To the outlet of receiver 206 is connected a liquid line 210 which leads to a pair of valves 211 and 212, the valve 211 being connected to an expansion valve 213 at the inlet of the winter evaporator 214. The outlet of the valve 212, on the other hand, is connected by a conduit 215 leading to an expansion valve 216 located at the inlet of the summer evaporator 7a. The outlet of the evaporators 214 and 7a are connected by pipes 217, 218 and 219 to the inlet of the compressor 200.

The valves 203, 204, 211 and 212 may be of either the solenoid or motorized type, and are shown herein as being of a type which closes when deenergized and which opens when energized. These valves and the valve 220 at the inlet of the heating coil 9a are arranged to be controlled by means of a relay generally indicated as 221, this relay being in turn controlled by means of a low limit temperature controller 222, a high limit temperature controller 223, and a high limit humidity controller 224. The humidity controller 224 and the relay 221 are also arranged to control a compressor starter 225. This compressor starter includes a relay coil 226 for operating a switch arm 227 which engages a contact 228. When this relay coil 226 is energized, the switch arm 227 is caused to engage contact 228, thereby completing a circuit from line wires 229 and 230 through wires 231, 232 and 233 for energizing the compressor motor 201. When the relay coil 226 is deenergized, however, the switch arm 227 is caused to disengage contact 228 by means of springs (not shown) or gravity, thereby deenergizing the compressor motor 201.

Referring to the relay 221, this comprises a relay coil 235 for operating switch arms 236 and 237, each of which cooperates with a pair of "in" and "out" contacts as shown. When the relay coil 235 is energized, the switch arms 236 and 237 are brought into engagement with the "in" contacts, while when the relay coil 235 is deenergized, the switch arms engage the "out" contacts.

The humidity controller 224 may be of any desired type and is shown as including a humidity responsive element 238 for actuating a pivoted arm 239 carrying a three-electrode type mercury switch 240, a spring 241 urging the arm 239 in a direction for maintaining the strands of the humidity responsive device taut. This instrument may be so designed and adjusted that when the relative humidity rises to an excessive value, such as 60%, the mercury switch 240 will be tilted for bridging the three electrodes. When the relative humidity is below this value, however, the switch 240 will be tilted to open position as shown.

The low limit temperature controller 222 is of the two-position type and may consist of a bellows 245 containing a volatile fill, this bellows actuating a pivoted arm 246 carrying a mercury switch 247. This instrument may be so designed as to tilt the mercury switch 247 to closed position when the space temperature falls below a value such as 72° F., while tilting said switch to open position when the space temperature is above this value. The high limit temperature controller 223 may be of the same general type as the controller 222 and includes a mercury switch 248. This instrument may be so adjusted as to tilt the switch 248 to open position whenever the space temperature is below 75° F. while tilting said switch to closed position when the space temperature rises above this value.

With the parts in the position shown, the relative humidity is below 60% as indicated by the mercury switch 240 being tilted to open position. The space temperature is below 72°, thus causing the mercury switch 247 to be closed. At this time, the mercury switch 248 is open. The closure of mercury switch 247 due to the space temperature being below 72° will energize the relay coil 235 by a circuit as follows: transformer secondary 250 of step-down transformer 251, wire 252, wire 253, mercury switch 247, wire 254, relay coil 235 and wire 255 back to transformer secondary 250. Energization of the relay coil 235 causes the switch arms 236 and 237 to engage their respective "in" contacts. Engagement of the switch arm 237 with its "in" contact will cause energization of valves 203, 211 and 220. The energizing circuit for valve 211 is as follows: transformer secondary 250, wire 252, wire 256, switch arm 236, wire 257, valve 211 and wire 258 to transformer secondary 250. It will be noted the valves 203 and 220 are connected across the wires 257 and 258 and consequently will be opened simultaneously with valve 211. Opening of valve 220 will permit the flow of steam or other heating medium through the heating coil 9a. It will be understood that if the compressor should be driven by an internal combustion engine, the waste heat of the engine may be supplied to this heating coil 9a. With the switch arms 236 and 237 engaging their respective "in" contacts, the valves 204 and 212 will not be energized and consequently these valves will remain closed. Engagement of the switch arm 237 with its "in" contact will energize the relay coil 226 as follows: transformer secondary 250, wire 252, wire 256, switch arm 237, wire 259, relay coil 226, wire 260 and wire 258 to transfer secondary 250. This will place the compressor into operation. Due to the valves 203 and 211 being opened while valves 204 and 212 are closed, refrigerant will pass from the compressor through valve 203 to the heating condenser 8a and then into the receiver 206, from which it flows through valve 211 into the outside evaporator 214 and from there back to the compressor. Therefore, for the illustrated position of the controllers, the compressor will be in operation and the system is conditioned for operating on the heating cycle.

When the space temperature rises above 72° F. the mercury switch 247 of the low limit controller 222 will be opened, which deenergizes the relay coil 235, thereby causing the switch arms 236 and 237 to disengage their "in" contacts and to engage their "out" contacts. Disengagement of the switch arm 237 from its "in" contact will break the energizing circuit for the compressor starter coil 226, thereby causing the compressor to stop. Disengagement of the switch arm 236 from its "in" contact will cause the valves 203, 211 and 220 to be deenergized and therefore these valves will close. At this time, engagement of the switch arm 236 with its "out" contact will energize the valve 204 as follows: transformer secondary 250, wire 252, wire 256, switch arm 236, wire 261, valve 204 and wire 258 to transformer secondary 250. Also, at this time engagement of the switch arm 237 with its "out" contact will energize the valve 212 as follows:

transformer secondary 250, wire 252, wire 256, switch arm 237, wire 262, valve 212, wire 263 and wire 258 to transformer secondary 250. Therefore, at this time the valves 212 and 204 will be open while the valves 203, 211 and 220 are closed. This will condition the refrigeration system for operating on the cooling cycle, refrigerant being allowed to pass from the compressor through valve 204 into the summer condenser 208 and from there through the receiver 206 and valve 212 into the cooling evaporator 7a, from which it passes back to the compressor.

If the space temperature rises above 72° F., the mercury switch 248 of the high limit temperature controller 223 will be closed, which completes a circuit through the compressor starter coil 226 as follows: transformer secondary 250, wire 252, wire 264, wire 265, mercury switch 248, wire 266, wire 267, wire 259, relay coil 226, wire 260 and wire 258 back to transformer secondary 250. This will place the compressor into operation and as the system is not conditioned for operating on the cooling cycle, the space temperature will be reduced by operation of the compressor at this time.

If the space relative humidity should become excessive, the mercury switch 240 of the humidity controller will be tilted to closed position, this causing energization of the compressor starter as follows: transformer secondary 250, wire 252, wire 264, mercury switch 240, wire 268, wire 267, wire 259, relay coil 226, wire 260 and wire 258 back to transformer secondary 250. Therefore, when the relative humidity becomes excessive the compressor will be placed into operation and as the system is conditioned for operating on the cooling cycle, the evaporator 7a will be chilled for cooling and dehumidifying the air. Due to the fact that operation of the evaporator both cools the air as well as dehumidifies it, the air temperature will be reduced. If the sensible cooling load happens to be low, the space temperature will fall to the setting of the low limit controller 222, thereby causing closing of the mercury switch 247. This will energize the relay coil 235, thereby causing the switch arms 236 and 237 to disengage their "out" contacts and to engage their "in" contacts. This action will result in breaking the energizing circuit for the valves 204 and 212 as previously described, and will result in energizing the valves 203, 211 and 220 for placing the system in condition for supplying heat to the space. At this time, however, the valve 212 will be energized by the humidity controller as follows: transformer secondary 250, wire 252, wire 264, mercury switch 240, wire 269, wire 262, valve 212, wire 263, and wire 258 back to transformer secondary 250. Therefore, due to the excessive humidity conditions, the compressor will be operated and the system will be conditioned for supplying heat to the space. Also, due to the valve 212 being held open, part of the refrigerant will pass into the cooling evaporator 7a, which causes chilling of this evaporator for continuing the dehumidifying of the air. From the foregoing description, it will be apparent that the system just described will operate in a manner to heat the space when heating is required, in a manner to cool the space when cooling is required, and will function to both cool and reheat when only dehumidification is required.

*Figure 3*

In Figure 3 I have shown a still further form which my invention may take. In this modification, a single heat exchanger is substituted in place of the separate summer outside condenser and winter evaporator of the system shown in Figure 2. Reference character 200a indicates a compressor which may, if desired, be driven by means of an electric motor 201a, which motor is provided with a magnetic starter 225a of the same type as described in connection with Figure 2. Leading from the compressor 200a is a discharge conduit 300, this conduit being connected to valves 301 and 302. The outlet of the valve 301 is connected by conduit 303 to the heating or winter condenser 304 which is located in the conditioning chamber 1b. The outlet of this condenser is connected to a receiver 305 which in turn is connected by a liquid line 306 to an expansion valve 307, this valve being connected to the evaporator-condenser 308 by means of connection 309. The expansion valve may be of the thermostatic type, having a temperature responsive bulb 310 located on the outlet pipe 311 of the evaporator-condenser 308, which outlet pipe is connected through a receiver 312 to pipe 313 which connects to a valve 314, which valve in turn is connected to the compressor inlet. The outlet of the valve 302 is connected by a pipe 302a to the inlet of the evaporator-condenser 308. The receiver 312 is connected by a liquid line 315 to an expansion valve 316 which is located at the inlet of the evaporator 7b. The outlet of this evaporator is connected by a conduit 317 to the inlet of the compressor 200a. The valves 301, 302 and 314 may be of the solenoid or motorized type and are preferably of the type which open when energized and which close when deenergized. These valves are arranged to be controlled by means of a relay 221a which is controlled by means of a low limit controller 222a which may be of the same type as the controller 222 in Figure 2. The relay 221a is provided with switch arms 318 and 319, switch arm 318 cooperating with an "in" contact while the switch 319 cooperates with both "in" and "out" contacts.

When the space temperature falls below 72° F., the mercury switch 320 of the low limit controller 222a will close, this completing a circuit through the relay coil 321 of the relay 221a as follows: secondary 322 of step-down transformer 323, wire 324, wire 325, mercury switch 320, wire 326, relay coil 321 and wire 327 back to secondary 322. This will cause the switch arms 318 and 319 to engage their "in" contacts. Engagement of the switch arm 319 with its "in" contact will energize valves 301 and 314. Valve 301 will be energized by the following circuit: secondary 322, wire 328, switch arm 319, wire 329, valve 301 and wire 330 back to the transformer secondary. The energizing circuit for valve 314 is as follows: secondary 322, wire 328, switch arm 319, wire 329, wire 331, valve 314, wire 332 and wire 330 back to secondary 322. At this time the valve 302 will not be energized. Due to engagement of the switch arm 318 with its "in" contact, the starter coil 333 of the magnetic starter will be energized as follows: transformer secondary 322, wire 327, switch arm 318, wire 334, coil 333 and wire 335 back to secondary 322.

Therefore, when the space temperature falls sufficiently low as to close the mercury switch 320 of the low limit controller, the compressor will be placed into operation and the valves 301 and 314 will be opened, while the valve 302 will be closed. Due to valves 301 and 314 being opened, refrigerant will pass from the compressor through valve 301 into the heating condenser 8b for thereby heating the air. The liquified refrigerant will then pass from this condenser through the receiver 305 and the expansion valve 307 into the evaporator-condenser, wherein it evaporates and thereby absorbs heat from the water or other heating medium supplied to this evaporator-condenser. The evaporated refrigerant will then pass into the receiver 312 and flow therefrom through the pipe 313 and the valve 314 to the compressor. The system will therefore operate in a manner to heat the space being conditioned. When the space temperature rises above the setting of the low limit controller 222, the mercury switch 320 will open thereby deenergizing the relay coil 321 of the relay 221a, this causing the switch arm 318 to disengage its "in" contact, which causes the energizing circuit for the compressor starter to be broken, thus stopping the compressor. Also at this time, the switch arm 319 will disengage the "in" contact, which breaks the energizing circuit for the valves 301 and 314, causing these valves to close. The switch arm 319, however, will now engage its "out" contact and energize the valve 302 as follows: transformer secondary 322, wire 328, switch arm 319, wire 336, valve 302, wire 337 and wire 330 back to secondary 322. This will cause the valve 302 to open.

As in the case of Figure 2, the compressor starter is also controlled by means of a high limit temperature controller 223a and a high limit humidity controller 224a. If the space temperature rises above the setting of the high limit temperature controller, the coil 333 of the compressor starter 225a will be energized as follows: transformer secondary 322, wire 324, wire 338, mercury switch 339, wire 340, wire 341, wire 334, coil 333 and wire 335 to secondary 322. Therefore, when the space temperature becomes too high, the compressor will be started. At this time, however, the refrigerant will flow from the compressor through the valve 302 which is now open, into the evaporator-condenser wherein it is condensed by the water or other medium being passed through this device. The liquified refrigerant will then leave this evaporator-condenser and flow into the receiver 312 from which it flows to the expansion valve 316 to the evaporator 7b, and from this evaporator back to the compressor. Therefore, when the high limit controller 323 places the compressor into operation, the system will operate on the cooling cycle for cooling the space.

It should be noted that the mercury switch 345 of the humidity controller 324a is connected in parallel with the mercury switch 339 of the high limit temperature controller. By this arrangement, it will be apparent that when the relative humidity becomes excessive, the compressor will be placed into operation by the relative humidity controller even though the space temperature may not be excessive. This humidity controller will therefore operate the compressor for causing dehumidification of the air. If the sensible cooling load on the system is not high, the space temperature may fall due to this operation of the compressor by the humidity controller. If the space temperature should fall below the setting of the low limit controller 222a, this controller will pull in the changeover relay 221a which will reverse the system, thereby causing it to supply heat to the space and preventing the space temperature from falling further. This supply of heat will continue until the space temperature again rises above the setting of the low limit controller, at which time the system will be again shifted to the cooling cycle and the dehumidifying process will be continued. It should therefore be seen that this control arrangement is similar to the control arrangement of Figure 1, in that it provides for intermittent reheat when reheat is necessary for securing proper humidity conditions.

From the foregoing, it should be apparent that my invention includes novel reversible cycle refrigeration arrangements, and also includes novel control arrangements for automatically causing the system to operate on either the heating or cooling cycle, and for controlling the system operation in a manner to always maintain proper temperature and humidity conditions within the space. Also, it will be seen that my invention provides for automatic control of a system of this type which is driven by means of an internal combustion engine, and automatically utilizes waste heat from this engine for supplying heat to the space, and for also providing a supply of domestic hot water.

While I have shown and described several embodiments of my invention, it will be apparent that many modifications which are within the spirit and scope of my invention will be apparent to those skilled in the art. I therefore desire to be limited only by the scope of the appended claims as construed in the light of the prior art.

I claim as my invention:

1. In a summer-winter air conditioning system, in combination, a compression refrigeration system including a compressor, an evaporator and a condenser both in heat exchange relationship with a space to be conditioned, changeover means for selectively placing said evaporator in operation while placing said condenser out of operation, or for placing said condenser in operation while placing said evaporator out of operation, space temperature responsive means for controlling said changeover means and said compressor, said space temperature responsive means being arranged to condition said condenser for operation and to place said compressor in operation when the above space temperature falls to a predetermined value, while placing said compressor out of operation and conditioning said evaporator for operation when the space temperature rises above a predetermined value, and means for placing said compressor in operation when the space temperature rises to a still higher value.

2. In a heating and cooling system, in combination, a compression refrigeration system including an evaporator in heat exchange relationship with a space for cooling said space, a condenser in heat exchange relationship with the space for heating the space, a compressor connected to said evaporator and to said condenser, temperature responsive means for placing said condenser into operation without said evaporator upon demand for heating, and for placing said condenser out of operation upon demand for cooling, and humidity responsive means for placing said evaporator into operation upon demand for dehumidification which is unaccompanied by a demand for cooling.

3. In a summer-winter air conditioning system, in combination, a compression refrigeration system including a compressor, an evaporator in heat exchange relationship with a space to be conditioned for cooling said space, a condenser in heat exchange relationship with said space for heating said space, a heat exchanger adapted for either absorbing or dissipating heat, connections between said compressor, condenser, evaporator and heat exchanger including valve means for selectively routing refrigerant from said compressor through said heat exchanger to said evaporator, or from said compressor through said condenser to said heat exchanger, space temperature responsive means for controlling said valve means and said compressor, said space temperature responsive means being arranged to position said valve means in a manner to cause routing of refrigerant through said condenser and to place said compressor in operation when the space temperature falls to a predetermined low value, while placing said compressor out of operation and positioning said valve means to cause routing of refrigerant through said evaporator when the space temperature rises above a predetermined value, and means for placing said compressor in operation when the space temperature rises to a still higher value.

4. In a summer-winter air conditioning system, in combination, a compression refrigeration system including a compressor, an evaporator in heat exchange relationship with a space to be conditioned for cooling said space, a condenser in heat exchange relationship with said space for heating said space, a heat exchanger adapted for either absorbing or dissipating heat, and connections between said compressor, condenser, evaporator and heat exchanger including valve means for selectively routing refrigerant from said compressor through said heat exchanger to said evaporator, or from said compressor through said condenser only to said heat exchanger and back to said compressor independently of said evaporator.

5. In a refrigeration system, in combination, a compressor, a condenser having an inlet and an outlet, an evaporator having an inlet and an outlet, a heat exchanger adapted for either absorbing or dissipating heat, said heat exchanger having an inlet and an outlet, conduit means connecting the outlet of the compressor with the condenser inlet and the heat exchanger inlet, valve means interposed in said conduit means for routing refrigerant from said compressor either directly to said condenser or to said heat exchanger, conduit means for connecting the outlet of the condenser to the inlet of said heat exchanger, conduit means for connecting the outlet of the heat exchanger to the evaporator inlet, conduit means for connecting the compressor inlet to the outlet of the evaporator, conduit means for connecting the compressor inlet with the outlet of said heat exchanger, and valve means interposed in said last mentioned conduit means.

6. In a summer-winter air conditioning system, in combination, a compression refrigeration system including a compressor, a first evaporator in heat exchange relationship with a space being conditioned, a second evaporator out of heat exchange relationship with said space, a first condenser in heat exchange relationship with said space, and a second condenser out of heat exchange relationship with said space, conduit means including valve means for selectively routing refrigerant from said compressor through said first condenser to said second evaporator, or through said second condenser to said first evaporator, space temperature responsive means for controlling said valve means and said compressor, said space temperature responsive means being arranged to position said valve means in a manner to place said compressor in operation and to position said valve means for causing routing of the refrigerant through said first condenser and second evaporator when the space temperature falls to a predetermined value, while placing said compressor out of operation and positioning said valve means for causing routing of the refrigerant through said second condenser and first evaporator when the space temperature rises to a predetermined value, and means for placing said compressor in operation when the space temperature rises to a predetermined higher value.

7. In a summer-winter air conditioning system, in combination, a compression refrigeration system including a compressor, an evaporator and a condenser both in heat exchange relationship with a space to be conditioned, changeover means for selectively placing said evaporator in operation while placing said condenser out of operation, or for placing said condenser in operation while placing said evaporator out of operation, space temperature responsive means for controlling said changeover means and said compressor, said space temperature responsive means being arranged to condition said condenser for operation and to place said compressor in operation when the space temperature falls to a predetermined value while placing said compressor out of operation and conditioning said evaporator for operation when the space temperature rises above a predetermined value, means for placing said compressor in operation when the space temperature rises to a still higher value, and means for conditioning said evaporator for operation and for operating said compressor whenever the space relative humidity becomes excessive.

8. In a summer-winter air conditioning system, in combination, a reversible cycle refrigeration system including a condenser and an evaporator both in heat exchange relationship with a space to be conditioned, changeover means for selectively placing either said condenser alone or said evaporator alone in operation depending upon whether heating or cooling is required, and means including a humidity responsive device for causing said changeover means to place said evaporator into operation when the space relative humidity becomes excessive, and means including a temperature responsive device for causing operation of said condenser when the space temperature is below a certain value even though said changeover means is causing operation of said evaporator.

9. In an air conditioning system, in combination, a compression refrigeration system including an evaporator in heat exchange relationship with a space for cooling said space, a condenser in heat exchange relationship with said space for heating said space, a compressor connected to said evaporator and to said condenser, and means including devices responsive to temperature and humidity for placing said compressor into operation upon demand for either heating, cooling, or dehumidification, for placing said condenser alone into operation upon demand for heating, for placing said evaporator alone into operation upon demand for cooling, and for placing both said evaporator and said condenser into operation upon demand for dehumidification and a resultant demand for heating.

10. In a summer-winter air conditioning system, in combination, a compression refrigeration system including a compressor, an internal combustion engine for driving said compressor, an automatic starting circuit for said engine, a controller for varying the output of said engine, an evaporator in heat exchange relationship with said space for cooling the space, a condenser in heat exchange relationship with said space for heating the space, means for connecting said evaporator and said condenser in operative relationship with said compressor, changeover means for selectively placing said evaporator out of operation while placing said condenser in operation or for placing said evaporator in operation while placing said condenser out of operation, and space temperature responsive means for controlling said changeover means and said engine, said space temperature responsive means being arranged to condition the condenser for operation and to close the starting circuit for the engine when the space temperature falls to a predetermined value, to condition the evaporator for operation when the space temperature rises to a predetermined value, automatically to cause closure of the starting circuit of said engine when the space temperature rises to a predetermined higher value, and to control the engine output controller in accordance with the demand for heating or cooling of the space.

11. In a summer-winter air conditioning system, in combination, a compression refrigeration system including a compressor, an internal combustion engine for driving said compressor, an automatic starting circuit for said engine, a controller for varying the output of said engine, an evaporator in heat exchange relationship with said space for cooling the space, a condenser in heat exchange relationship with said space for heating the space, means for connecting said evaporator and said condenser in operative relationship with said compressor, changeover means for selectively placing said evaporator out of operation while placing said condenser in operation or for placing said evaporator in operation while placing said condenser out of operation, a heat exchanger in heat exchange relationship with said space, means for collecting waste heat from the engine, means for selectively transferring the collected waste heat to said heat exchanger or to a heat accumulator, said last named means being actuated with said changeover means, and temperature responsive means for controlling the engine starting circuit and output controller and for controlling said changeover means.

12. In an air conditioning system for conditioning a space, in combination, a reversible cycle refrigeration system including means in heat exchange relationship with the space, a compressor, a condenser for dissipating heat during the cooling cycle, an evaporator for absorbing heat during the heating cycle, changeover means for selectively routing refrigerant from said compressor through said condenser to said means in heat exchange relationship with the space, or from said compressor through said last mentioned means to said evaporator, an internal combustion engine for driving the compressor, means for supplying cooling medium to said engine, means for passing the thereby heated medium in heat exchange relationship with said space and for storing at least part of said medium, valve means for preventing said medium from passing in heat exchange relationship with said space, temperature responsive means for controlling said changeover means and said valve means for placing the system on the heating cycle when heating is required and for placing the system on the cooling cycle when cooling is required, temperature responsive means for controlling the engine in accordance with requirements for heating and cooling, and means responsive to the temperature of said stored medium for causing discharge of said stored medium into heat exchange relationship with said evaporator when the temperature of the stored medium becomes excessive.

13. In an air conditioning system for conditioning a space, in combination, a reversible cycle refrigeration system including means in heat exchange relationship with the space, a compressor, a condenser for dissipating heat during the cooling cycle, an evaporator for absorbing heat during the heating cycle, changeover means for selectively routing refrigerant from said compressor through said condenser to said means in heat exchange relationship with the space, or from said compressor through said last mentioned means to said evaporator, an internal combustion engine for driving the compressor, means for supplying cooling medium to said engine, means for passing the thereby heated medium in heat exchange relationship with said space and for storing at least part of said medium, valve means for preventing said medium from passing in heat exchange relationship with said space, temperature responsive means for controlling said changeover means and said valve means for placing the system on the heating cycle when heating is required and for placing the system on the cooling cycle when cooling is required, means for supplying cooling medium to said condenser, said means being responsive to the pressure of the refrigerant therein for thereby stopping the flow of such cooling medium when no refrigerant is routed through said condenser, and means responsive to the temperature of said stored medium for causing discharge of said stored medium into heat exchange relationship with said evaporator when the temperature of the stored medium becomes excessive.

14. In a refrigeration system adapted for heating a space, in combination, a compressor, an evaporator for absorbing heat externally of said space, a condenser in heat exchange relationship with said space for heating said space and connected to said evaporator and compressor, an internal combustion engine for driving said compressor, a storage tank system for storing heated medium, means for transferring waste heat from said engine to said storage tank, means responsive to the temperature of the heated medium for withdrawing medium from said storage tank system when the temperature of the medium becomes excessive, and means for passing said withdrawn medium in heating exchange relationship with said evaporator.

15. In a heating and cooling system, in combination, a compression refrigeration system including an evaporator in heat exchange relationship with a space for cooling said space, a compressor connected to said evaporator, an internal combustion engine for driving said compressor, means for placing said engine into operation upon demand for either heating, cooling, or dehumidification, means for supplying waste heat from the engine to said space, means for placing said supplying means into operation upon demand for heating while placing said supplying means out of operation upon demand for cooling, and means for placing said supplying means into operation upon a demand for dehumidification which is unaccompanied by a demand for cooling.

16. In an air conditioning system, in combination, a reversible cycle refrigeration system adapted for heating or cooling a space, said system including a compressor, a by-pass for unloading said compressor, an internal combustion engine for driving said compressor, an automatic starting circuit for said internal combustion engine, changeover means for selectively conditioning said refrigeration system for cooling said space or for heating said space, means controlled by said changeover means for supplying heat to said space from said engine when said refrigeration system is conditioned for heating said space, temperature responsive means for controlling said starting circuit and said changeover means for automatically controlling the system, means interconnected with said engine starting circuit for opening said by-pass while said engine is being started, and means responsive to the pressure of the refrigerant discharged from the compressor for opening said by-pass when the pressure of said discharged refrigerant becomes excessive.

17. In air air conditioning system, in combination, a refrigeration system having a compressor, a condenser, and an evaporator, said condenser being in heat exchange relationship with said air for heating the same, and said evaporator being arranged to absorb heat externally of said space, means for passing refrigerant from said compressor through said condenser to said evaporator, a humidifier for humidifying the air, means interposed between said condenser and evaporator for placing the refrigerant flowing from said condenser to said evaporator in heat exchange relationship with said humidifier, an internal combustion engine for driving said compressor, means for transferring waste heat from said engine to said air to supplement the heating action of said condenser, and means for controlling said internal combustion engine.

18. In an air conditioning system, in combination, a refrigeration system having a compressor, a condenser, and an evaporator, said condenser being in heat exchange relationship with said air for heating the same, and said evaporator being arranged to absorb heat externally of said space, means for passing refrigerant from said compressor through said condenser to said evaporator, a humidifier for humidifying the air, and means interposed between said condenser and evaporator for placing the refrigerant flowing from said condenser to said evaporator in heat exchange relationship with said humidifier.

19. In a refrigeration system adapted for heating a space, in combination, a compressor, a condenser connected to receive refrigerant from said compressor, said condenser being in heat exchange relationship with said space for heating said space, an evaporator for absorbing heat externally of said space and connected to said compressor and condenser, a storage tank, an internal combustion engine for driving said compressor, means collecting heat from said engine and for delivering it to said storage tank, and means actuated in response to temperature for delivering said collected heat to said evaporator when it is undesirable to store said heat in said storage tank.

20. In a refrigeration system adapted for heating a space, in combination, a compressor, a condenser connected to receive refrigerant from said compressor, said condenser being in heat exchange relationship with said space for heating said space, an evaporator for absorbing heat externally of said space and connected to said compressor and condenser, a storage tank, means for driving said compressor, means for collecting heat and storing it in said storage tank, and means actuated in response to temperature for delivering said collected heat to said evaporator when it is undesirable to store such heat in said storage tank.

21. In a refrigeration system adapted for heating a space, in combination, a compressor, a condenser connected to receive refrigerant from said compressor, said condenser being in heat exchange relationship with said space for heating said space, an evaporator for absorbing heat externally of said space and connected to said compressor and condenser, a storage tank system for storing heated medium, means for transferring heat to said storage tank, means for withdrawing medium from said storage tank system, and means for passing said withdrawn medium in heat exchange relationship with said evaporator.

22. In a system of the class described, a refrigeration system for conditioning a space, said system including a condenser, and a compressor for discharging compressed refrigerant into said condenser, an internal combustion engine for driving said compressor, an automatic starting circuit for said internal combustion engine, temperature responsive means for controlling said starting circuit to start said engine upon a demand for temperature change, a by-pass for unloading said compressor, a single electrically operated by-pass valve controlling the flow of fluid through said by-pass, a circuit controlled concurrently with said engine starting circuit for opening said by-pass valve while said engine is being started, a second circuit for said by-pass valve and a switch responsive to the pressure of the refrigerant discharged from the compressor for closing said second circuit to open said by-pass valve when the pressure of the discharged refrigerant becomes excessive.

ALWIN B. NEWTON.